US008162747B2

(12) United States Patent
Hayasaka

(10) Patent No.: US 8,162,747 B2
(45) Date of Patent: Apr. 24, 2012

(54) GAME CONTROL METHOD AND APPARATUS FOR CONTROLLING RESUMPTION OF GAME

(75) Inventor: Megumi Hayasaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 984 days.

(21) Appl. No.: 11/749,806

(22) Filed: May 17, 2007

(65) Prior Publication Data

US 2008/0004095 A1 Jan. 3, 2008

(30) Foreign Application Priority Data

Jul. 3, 2006 (JP) ................................ 2006-183931

(51) Int. Cl.
*A63F 9/24* (2006.01)
(52) U.S. Cl. ................. 463/24; 463/25; 463/30; 463/31
(58) Field of Classification Search ............... 463/24, 463/25, 30, 31
See application file for complete search history.

(56) References Cited

U.S. PATENT DOCUMENTS

| | | | | |
|---|---|---|---|---|
| 5,801,786 | A * | 9/1998 | Song ............................. | 348/564 |
| 6,280,323 | B1 * | 8/2001 | Yamazaki et al. ............... | 463/4 |
| 6,422,939 | B1 * | 7/2002 | Koyama et al. ................. | 463/6 |
| 6,966,831 | B2 * | 11/2005 | Miyaki et al. .................. | 463/1 |
| 2002/0082063 | A1 * | 6/2002 | Miyaki et al. .................. | 463/1 |
| 2006/0031776 | A1 * | 2/2006 | Glein et al. .................... | 715/779 |

FOREIGN PATENT DOCUMENTS

| | | | |
|---|---|---|---|
| EP | 1136105 A1 * | 9/2001 | |
| JP | 11-42368 | 2/1999 | |
| JP | 2001-38049 | 2/2001 | |
| JP | 2005-268991 | 9/2005 | |
| JP | 2006-67065 | 3/2006 | |

OTHER PUBLICATIONS

Decision of Refusal mailed Feb. 3, 2009, from the corresponding Japanese Application.
Notification of Reason(s) for Refusal mailed Jul. 15, 2008, from the corresponding Japanese Application.

* cited by examiner

*Primary Examiner* — Dmitry Suhol
*Assistant Examiner* — Brandon Gray
(74) *Attorney, Agent, or Firm* — Katten Muchin Rosenman LLP

(57) ABSTRACT

A game control program is provided to improve user convenience of a game. A game control unit executes a game program, and records a history into a history holding unit while controlling progress of the game. When an operation instruction to pause the game is accepted from the user, a pause control unit stops the progress of the game with the display screen at that point in time displayed. When a request to resume the game is accepted from the user, a resume control unit resumes the game after display screens and sound are reproduced from a point in time which is a predetermined period before the pausing point up to the pausing point.

18 Claims, 14 Drawing Sheets

GAME CONTROL METHOD AND APPARATUS FOR CONTROLLING RESUMPTION OF GAME

BACKGROUND OF THE INVENTION

1. Field of the Invention

The present invention relates to a game control technology, and in particular, to a game control program product, a game control method, and a game apparatus which control resumption of a game after the game is paused.

2. Description of the Related Art

Game apparatuses often include the function of pausing game progress. For example, if a game is in progress when depression is detected of a button to which the pausing function has been assigned, the progress of the game is stopped with the display screen at that point displayed. The game is then resumed when depression is detected of a button to which a game-resuming function has been assigned.

In cases where a role-playing game is paused while a player's character is traveling in the game field, users will not be required to make immediate operations when the game is resumed. On the other hand, in the cases of pausing a shooting game, beat-'em-up game or the like where quick user operations are the key to winning, the user needs to start operating the resumed game immediately after the game-resuming button is depressed. Resuming the game can thus put the user at a disadvantage compared to playing the game continuously. In addition, it is necessary for the user to memorize the game situation immediately before pausing and remember in advance what to do after resuming, or the challenges of the game cannot immediately be coped with.

SUMMARY OF THE INVENTION

The present invention has been achieved in view of the foregoing circumstances. It is thus a general purpose of the present invention to provide a technology for improving the convenience of a game to a user.

One embodiment of the present invention relates to a game control program product. This game control program product comprises: a module which controls progress of a game in accordance with an operation instruction accepted from a user; a module which generates a display screen of the game and displays it on a display device; a module which stops the progress of the game with the display screen at that point in time displayed on the display device when an operation instruction to pause the game is accepted from the user; and a module which resumes the game after redisplaying display screens from a point in time which is a predetermined period before the pausing point up to the pausing point on the display device when a request to resume the game is accepted from the user with the game in a paused state.

It should be appreciated that any combinations of the foregoing components, and any conversions of expressions of the present invention between methods, apparatuses, systems, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A game apparatus according to the embodiment provides a game involving the operation of specified buttons in time to music and competing in terms of the accuracy of operations. The game apparatus calculates a score based on the types, timing, and like aspects of the buttons pressed by the user.

In this game apparatus, if the game is once paused and then resumed, it is likely that the user will not be able to grasp the exact timing of the pause and will fail to make proper operations when the game is resumed and the music starts again from the pausing point. Getting into the melody and rhythm also takes time, which precludes smooth resumption of the game.

In the present embodiment, the display screens and music of the game are therefore reproduced again from a point in time which is a predetermined period before the pausing point up to the pausing point, and then the game is resumed. This allows the user to recall the game situation immediately prior to pausing, and re-enter the game smoothly. Moreover, since there is an interval between when a game-resuming button is depressed and when the game is resumed, it is possible to make preparations for operation and cope with the challenges of the game if it requires quick operations.

Figure 1:
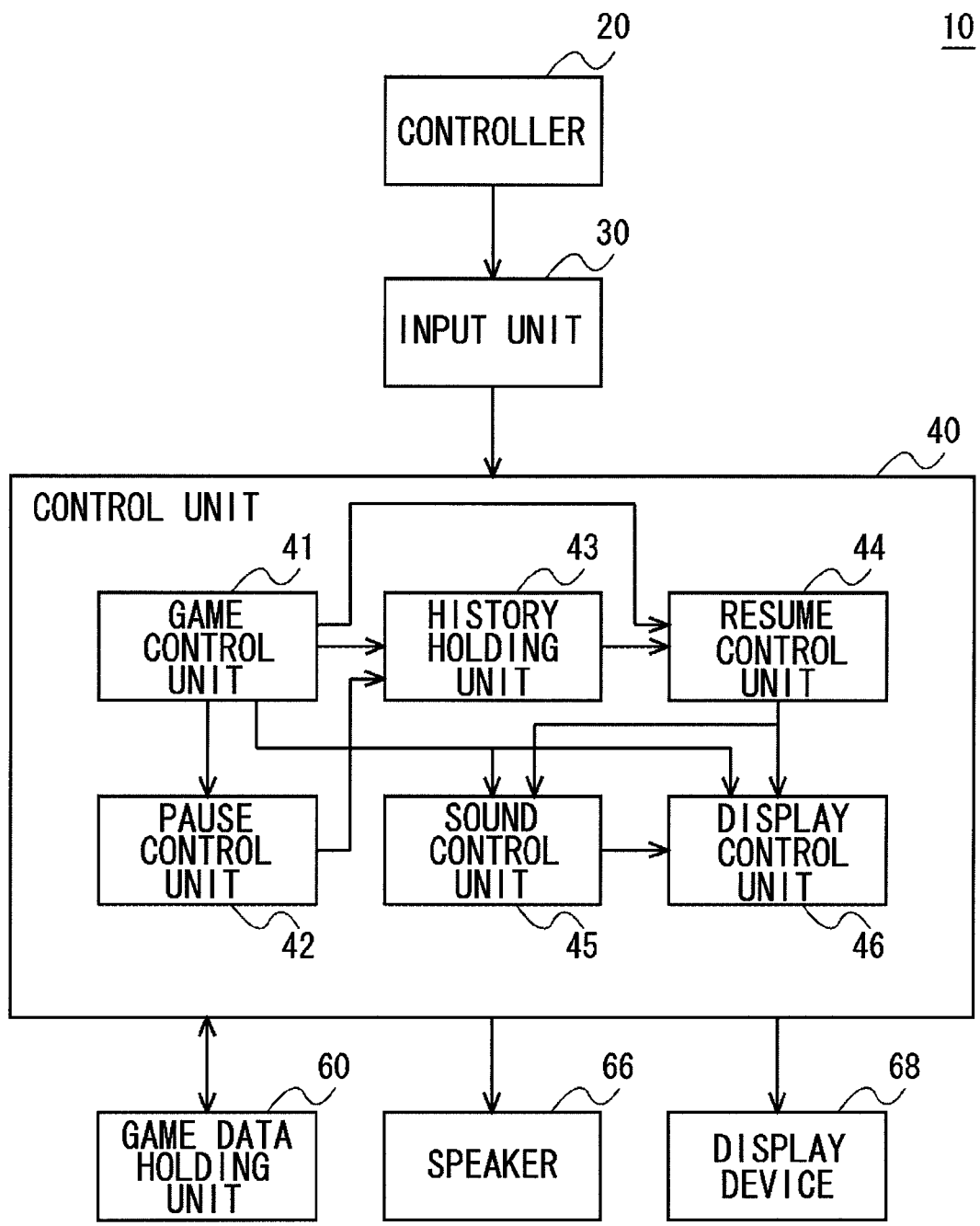
FIG. 1 is a diagram showing the configuration of a game apparatus.

FIG. 1 shows the configuration of a game apparatus 10. The game apparatus 10 includes a controller 20, an input unit 30, a control unit 40, a game data holding unit 60, a speaker 66, and a display device 68. In terms of hardware, these components can be realized by a CPU of an arbitrary computer, a memory, a program loaded into the memory, etc. This diagram shows functional blocks to be achieved through the cooperation of these elements. It will thus be understood by those skilled in the art that these functional blocks may be practiced in various forms including hardware alone, software alone, or a combination of these.

The input unit 30 accepts user's operation instructions which are input from the controller 20, an example of the user interface. The control unit 40 executes a game program based on the user's operation instructions accepted by the input unit 30, thereby making the game progress. The game data holding unit 60 stores the game program and data necessary for the progress of the game. For example, the game data holding unit 60 contains sound data relating to songs, moving image data relating to characters, and so on. The game data holding unit 60 may be a recording medium such as a CD-ROM and a DVD-ROM. The speaker 66 outputs sound which is generated by the control unit 40. The display device 68 displays a game screen which is generated by the control unit 40.

Figure 2:
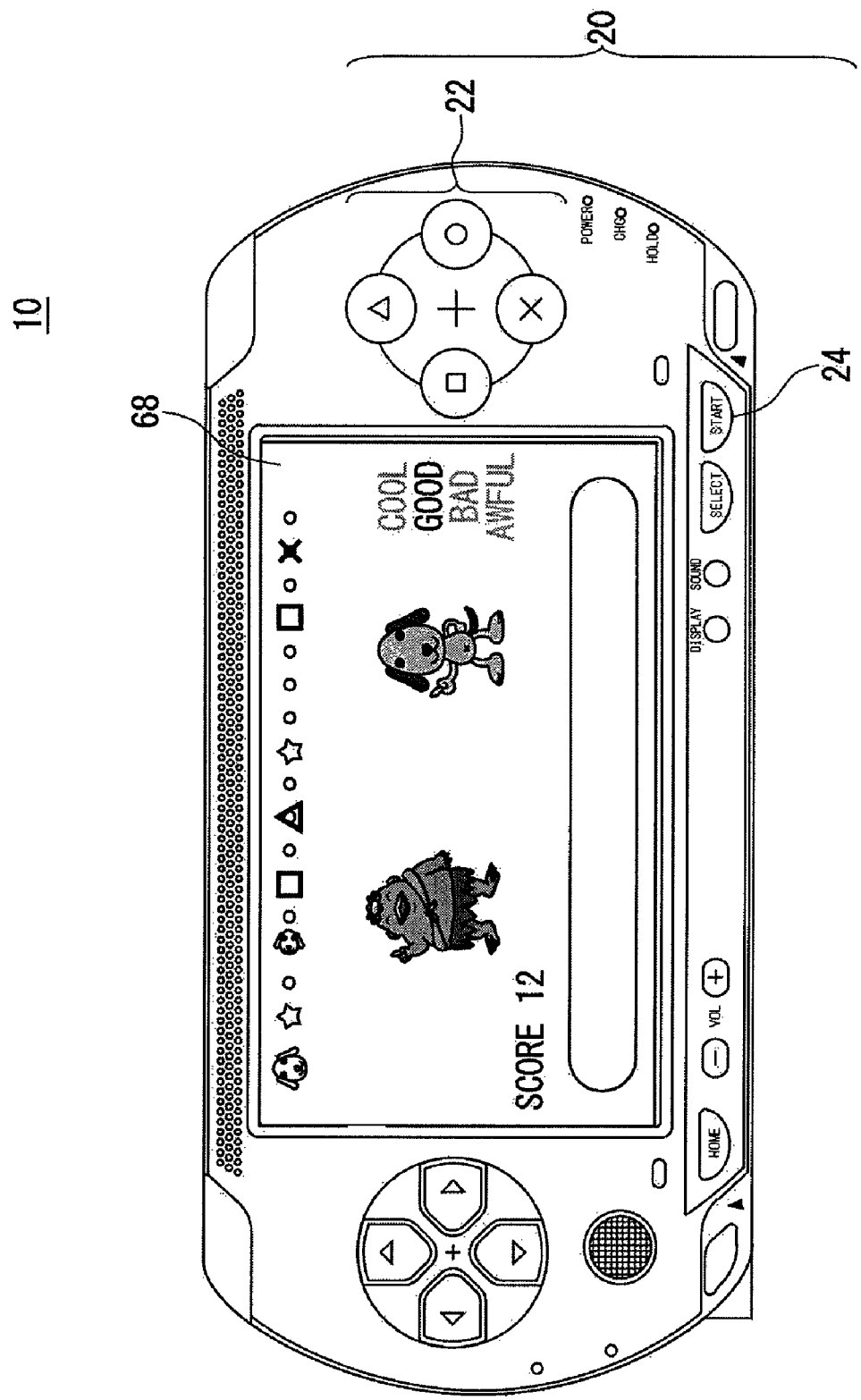
FIG. 2 is a diagram showing the appearance of the game apparatus.

FIG. 2 shows the appearance of the game apparatus 10. The display device 68 displays the following items: a key sequence which shows the types of buttons to press and the timing for pressing them; a tutor character which sets an example to the user; a player's character which moves with user's button operations; 4-level evaluations on the user's button operations, including "COOL," "GOOD," "BAD," and "AWFUL"; and a user's score. The controller 20 has operation buttons 22 which the user operates in time to music, and a pause button 24 from which instructions to pause the game and resume the game are made. After an example is set by the moving image of the tutor character, the user operates the operation buttons 22 in time to the music while viewing the key sequence presented.

Returning to FIG. 1, description of the configuration of the control unit 40 will be continued. The control unit 40 includes a game control unit 41, a pause control unit 42, a history holding unit 43, a resume control unit 44, a sound control unit 45, and a display control unit 46.

The game control unit 41 executes the game program and controls the game of operating buttons in time to a song. The game control unit 41 reads music data relating to the song and moving image data relating to the characters from the game data holding unit 60, decompresses them if compressed, and transmits the same to the sound control unit 45 and the display control unit 46. It also reads key sequence data and transmits the same to the display control unit 46 for screen display. The game control unit 41 acquires the types and timing of operation buttons 22 input by the user from the controller 20. It makes the sound control unit 45 generate lines sung by the player's character as assigned to the respective operation buttons 22, and makes the display control unit 46 generate moving images in which the player's character performs actions corresponding to the lines. This makes it possible to show the player's character operated by the user as if singing along to the song. The game control unit 41 calculates the score based on the accuracy of the button operations made by the user.

Aside from the score, the game control unit 41 also evaluates the accuracy of the user's operations in four levels "COOL," "GOOD," "BAD," and "AWFUL" with respect to each phrase. This evaluation is managed separately from the score. For example, an evaluation of "GOOD" is given if an operation made for the first phrase is accurate, and "BAD" if inaccurate. Subsequently, the evaluation is improved by one level if operations made for the next phrase are better than a predetermined criterion, downgraded by one level if worse than a predetermined criterion, and maintained at the same level in the other cases.

The game data holding unit 60 contains four types of music data and moving image data corresponding to the respective four levels of evaluation, so that a song and a moving image corresponding to the level are reproduced. For example, in the "COOL" level, the tutor exits the screen so that the player's character performs a solo. A song with a bright tone is reproduced in the "GOOD" level, a dull tone in the "BAD" level, and a harsh tone in the "AWFUL" level. When the evaluation falls below "AWFUL," the song is stopped at that point and the game is over.

Even if the user operates buttons at timing different from that of the key sequence presented to the user, the game control unit 41 may give high marks when the song of the player's character performs with those operations is excellent. Specifically, the game control unit 41 retains a target key sequence in advance for which high marks are given, aside from the key sequence presented to the user. Even if the user's operations do not match the presented key sequence, a high score or evaluation can be given if they match the unpresented key sequence.

The display control unit 46 generates the screen of the game controlled by the control unit 41, and displays it on the display device 68. The display control unit 46 acquires the moving image data, key sequence, score, evaluation, and the like transmitted from the game control unit 41, and generates a display screen such as that shown in FIG. 2. The display control unit 46 acquires the types and timing of button operations actually performed by the user from the game control unit 41, and displays the types of the buttons operated by the user and evaluations of the timing along the key sequence. When a single phrase ends, an evaluation of that phrase is also displayed.

The sound control unit 45 generates the sound of the game controlled by the control unit 41, and outputs it from the speaker 66. The sound control unit 45 outputs sound data transmitted from the game control unit 41 to the speaker 66, and also outputs lines and sound corresponding to the operation buttons 22 operated by the user. When a single phrase ends, sound effects corresponding to the evaluation of that phrase are also output.

The game control unit 41 records a history of parameters necessary for regenerating previously-displayed display screens and previously-output sound, into the history holding unit 43 during the progress of the game. This history information is used to reproduce display screens and sound from a point in time which is a predetermined period before, when resuming a paused game. The history holding unit 43 may retain a history of buttons operated by the user, camera motions and visual effects for the display control unit 46 to generate a screen with, special effects for the sound control unit 45 to generate sound with, and so on. Then, the display screens and sound may be regenerated by the game control unit 41, the display control unit 46, the sound control unit 45, and the like when resuming the paused game. Alternatively, the display screens and the sound may be stored as image data and sound data for reproduction.

Figure 3:
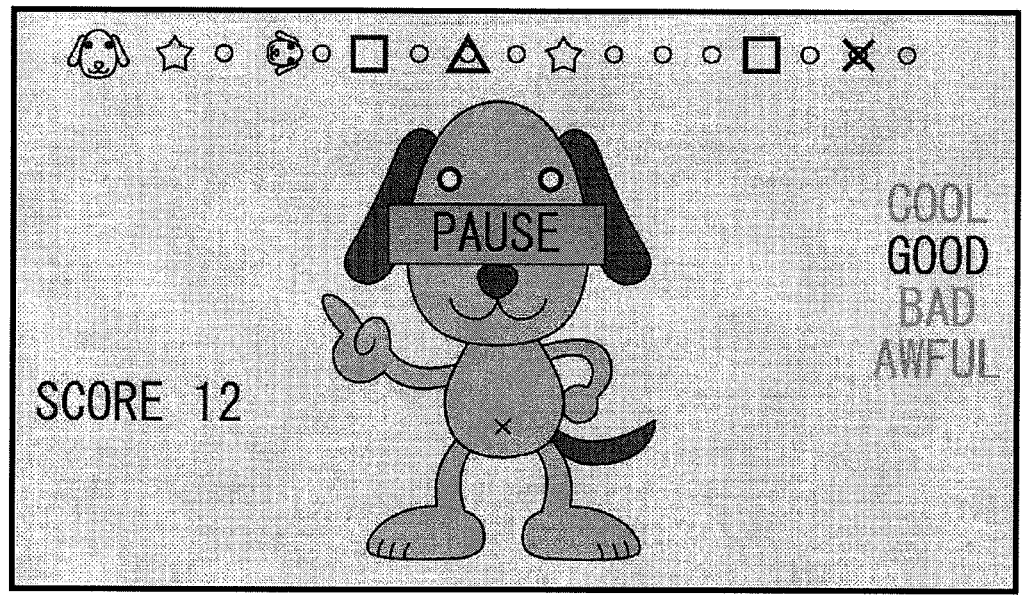
FIG. 3 is a diagram showing an example of a display screen during a pause.

When the pause control unit 42 accepts from the input unit 30 that the user has pressed the pause button 24 to request a game pause, it stops the progress of the game by the game control unit 41 with the display screen as displayed at that point in time displayed on the display device 68. FIG. 3 shows an example of the display screen during a pause. Text "PAUSE" appears on the paused display screen to indicate that the game is being paused.

Suppose that the user presses the pause button 24 again in the paused state, requesting to resume the game. Accepting this from the input unit 30, the resume control unit 44 reproduces the display screens and sound again from a point in time which is a predetermined period before the pausing point up to the pausing point, and then makes the game control unit 41 resume the game.

Figure 4:
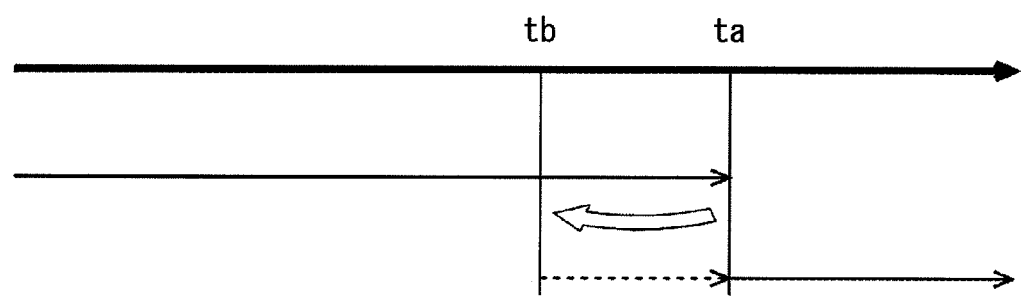
FIG. 4 is a diagram schematically showing how a game progresses.

FIG. 4 schematically shows how the game progresses. When the user presses the pause button 24 at time ta, the game is paused with the display screen at that point in time displayed as shown in FIG. 3. Subsequently, when the user presses the pause button 24 again, the resume control unit 44 refers to the parameters retained in the history holding unit 43, and makes the display control unit 46 and the sound control unit 45 regenerate display screens and sound from the point tb, i.e., the predetermined period before the pausing point, up to the pausing point ta. When the display screen at time ta is reached, the resume control unit 44 makes the game control unit 41 resume the game.

The game control unit 41 rejects operation instructions from the user while the resume control unit 44 redisplays the display screens from time tb to time ta on the display device 68. This precludes the part of the game already played from being played again.

Figure 5A:
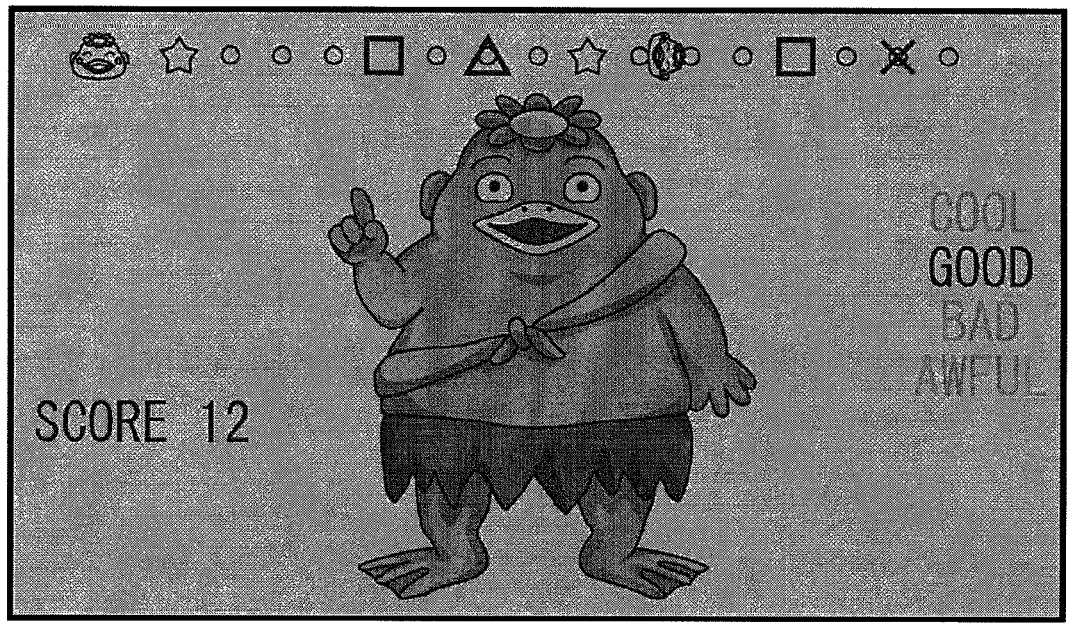
FIGS. 5A and 5B are diagrams showing examples of the display screens to be displayed before resuming the game.
Figure 5B:
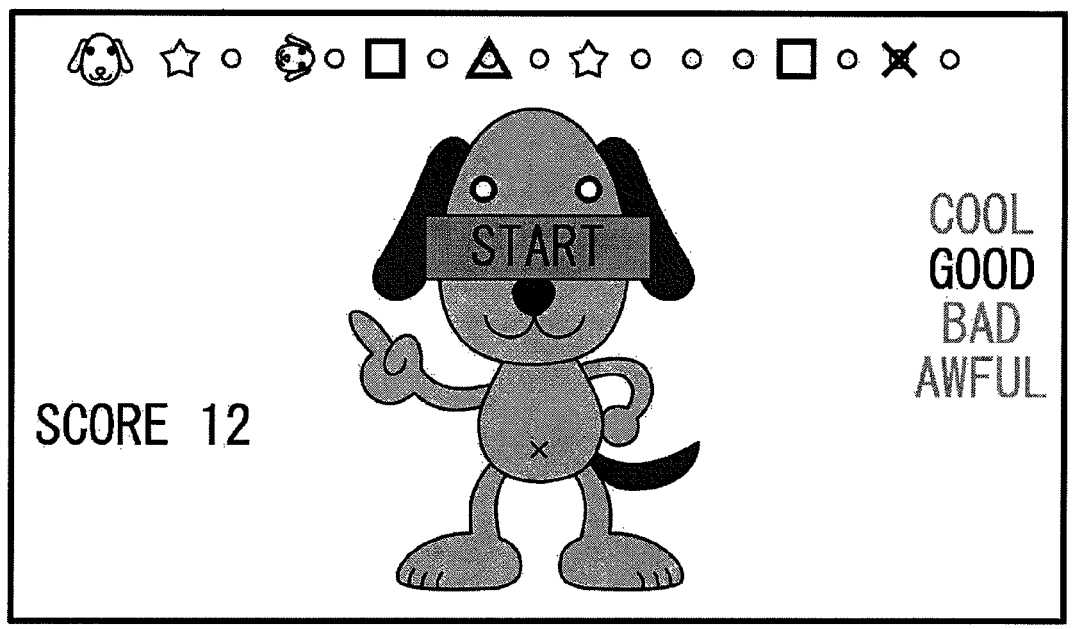

FIGS. 5A and 5B show examples of the display screens to be displayed before resuming the game. As shown in FIG. 5A, while past display screens from time tb to time ta are redisplayed, the display screens are displayed in a display mode different from that of a normal display screen generated by the display control unit 46, such as with additional noise. This allows the user to easily recognize that the currently-appearing display screens are past game screens and the game is yet to be resumed. After the display screens are redisplayed on the display device 68 up to the pausing point ta, the resume control unit 44 identifiably notifies the user of the resumption of the game on the display device 68, such as by displaying text "START" as shown in FIG. 5B. Then, it makes the game control unit 41 resume the game. This allows the user to easily recognize when the game is resuming. Since there is a preparatory period before resuming from a pause, the user can also resume the game smoothly. The display mode may be changed back into the normal display mode gradually, such as by reducing the noise added to the past display screens gradually to reach zero at time ta. This allows the user to predict the time to the resumption of the game.

Figure 6A:
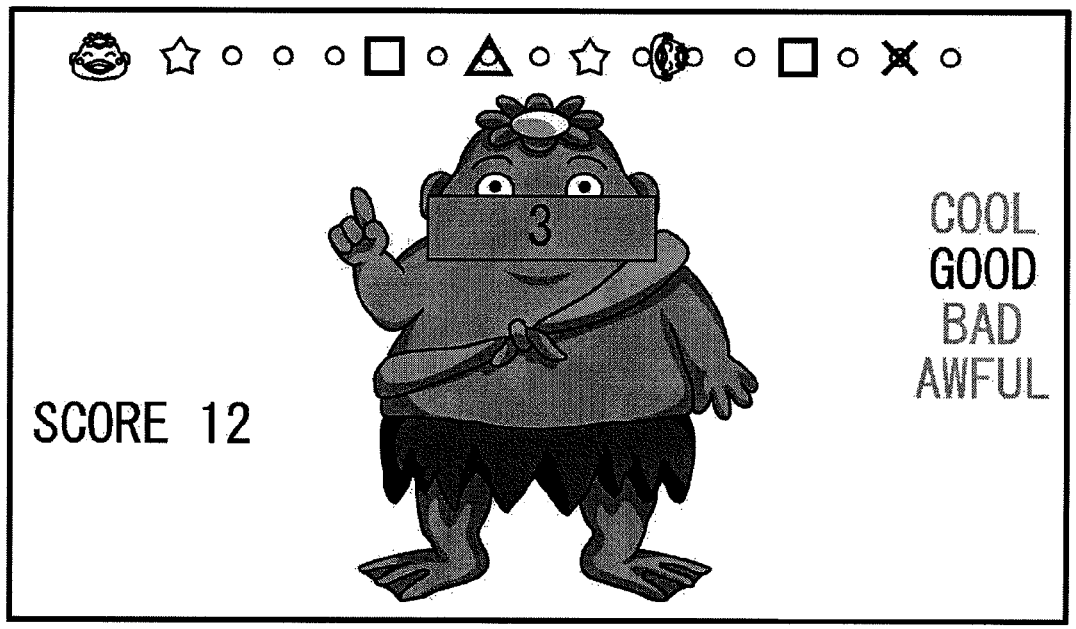
FIGS. 6A and 6B are diagrams showing examples of the display screens to be displayed before resuming the game.
Figure 6B:
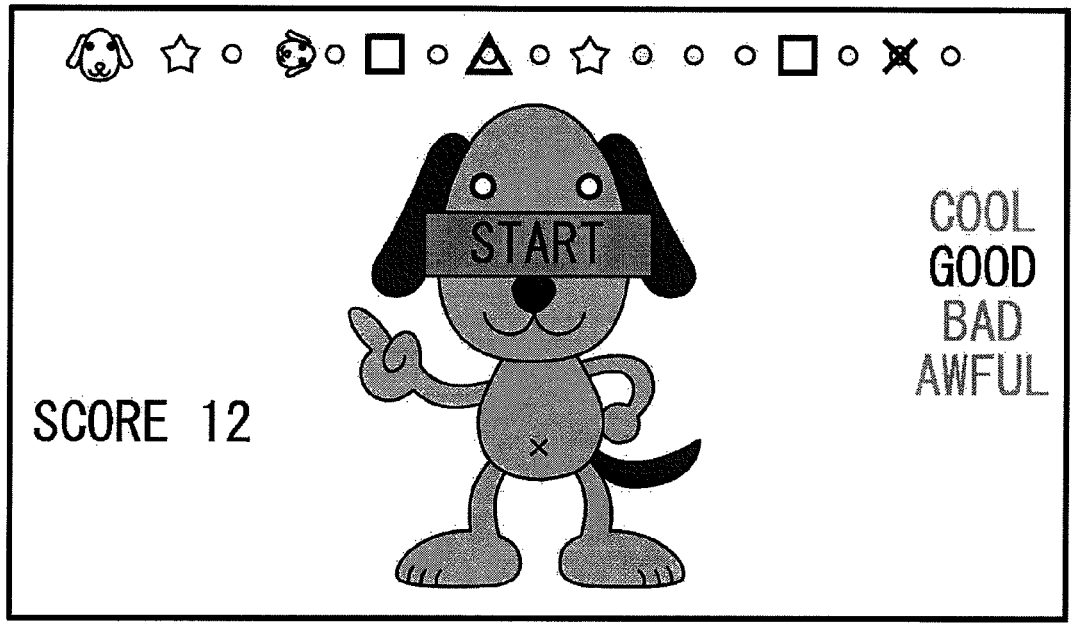

FIGS. 6A and 6B show other examples of the display screens to be displayed before resuming the game. As shown in FIG. 6A, numerals such as "3," "2," and "1" are displayed to count down while the past display screens are redisplayed from time tb to time ta. The user can thus easily recognize that the game is yet to be resumed, and easily grasp the timing of resumption of the game.

When the resume control unit 44 accepts a request to resume the game from the user, it may split the display area of the display device 68 into a display area for displaying a paused screen and a display area for displaying a redisplay screen. The paused screen shows the display screen at the pausing point, and the redisplay screen shows the display screens from a point in time which is a predetermined period before the pausing point up to the pausing point. Then, the display area of the paused screen may be decreased gradually and the display area of the redisplay screen increased gradually, so as to change gradually into a normal game screen.

Figure 7:
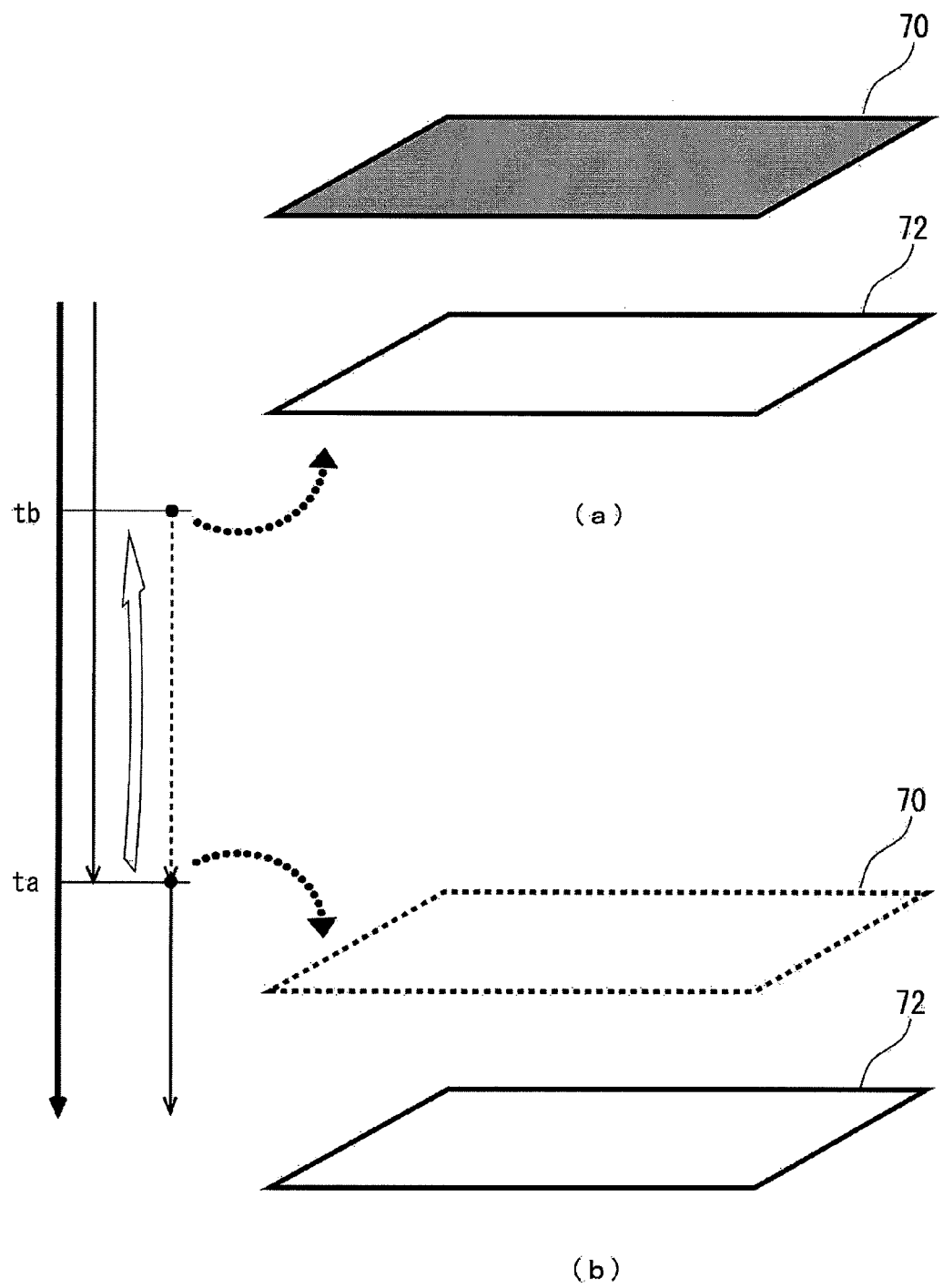
FIG. 7 is a diagram showing a layer for displaying a paused display screen and a layer for redisplaying past display screens before resuming the game.

FIG. 7 shows a paused screen layer 70 for displaying a fixed display screen at the pausing point, and a redisplay screen layer 72 for displaying display screens from time tb to time ta. As shown in (a) of FIG. 7, both the paused screen layer 70 and the redisplay screen layer 72 are displayed when resuming a paused game. Between time tb and time ta, the paused screen layer 70 at the top is made to disappear gradually with a corresponding increase in the display area of the redisplay screen layer 72. This achieves a gradual shift from the paused screen layer 70 to the redisplay screen layer 72. The display screen displayed on the redisplay screen layer 72 at time ta coincides with the display screen at the time of pausing. As shown in (b) of FIG. 7, the paused screen layer 70 is thus made to disappear at time ta, so that game screens generated by the display control unit 46 appear subsequently. This allows the user to recognize easily that the game is yet to be resumed, and grasp the timing of resumption of the game easily. Since the display screen in the paused state is not switched abruptly to the redisplay screen at time tb but is changed gradually until the paused screen disappears, the game can be smoothly resumed even visually.

Figure 8:
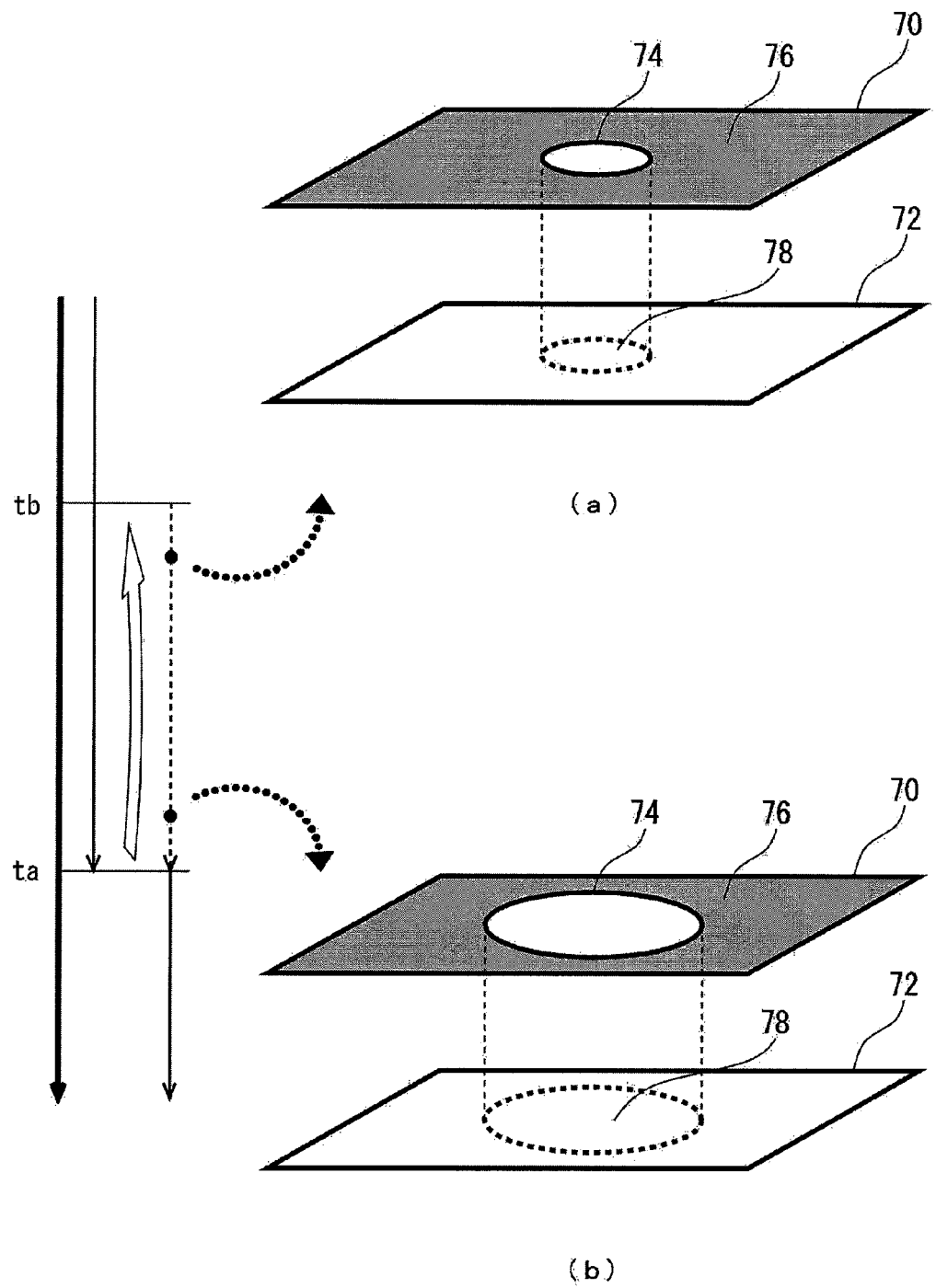
FIG. 8 is a diagram showing an example of a method by which the layer for displaying a paused display screen is gradually changed to the layer for redisplaying past display screens.

FIG. 8 shows an example of a method by which the paused screen layer 70 is gradually changed to the redisplay screen layer 72. As shown in (a) of FIG. 8, the overlying paused screen layer 70 is perforated near its center with a circular hole 74 through which the underlying redisplay screen layer 72 is visible. On the display screen of the display device 68, the area outside the hole 74 therefore comprises a display area 76 for the paused screen and the area inside the hole 74 comprises a display area 78 for the redisplay screen. Then, as shown in (b) of FIG. 8, the diameter of the circular hole 74 is increased over time. Using such a technique, the resume control unit 44 splits the display area of the display device 68 with a predetermined figure, with the display area 76 of the paused screen being outside the figure and the display area 78 of the redisplay screen being inside the figure. The figure is then expanded gradually so that the display area 76 of the paused screen decreases gradually and the display area 78 of the redisplay screen increases gradually.

Figure 9A:
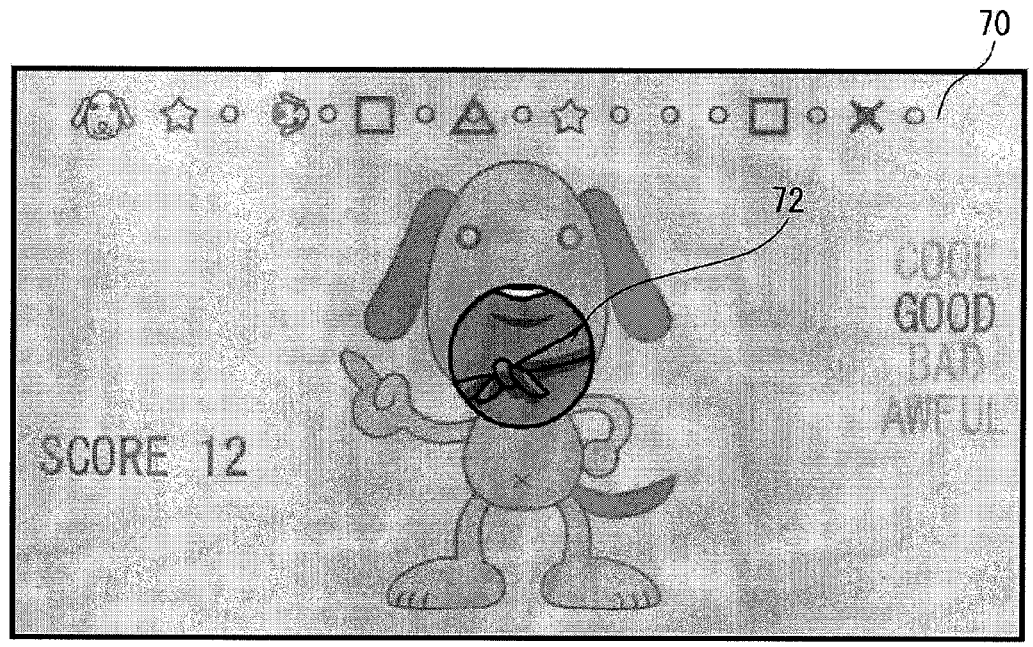
FIGS. 9A and 9B are diagrams showing examples of the display screens to be displayed before resuming the game.
Figure 9B:

FIGS. 9A and 9B show examples of the actual display screens displayed by the method of FIG. 8. As shown in FIG. 9A, past display screens displayed on the redisplay screen layer 72 start to become visible through the hole in the paused screen layer 70. The hole increases in diameter as shown in FIG. 9B. The paused screen layer 70 disappears at time ta, and the game is resumed.

Figure 10A:
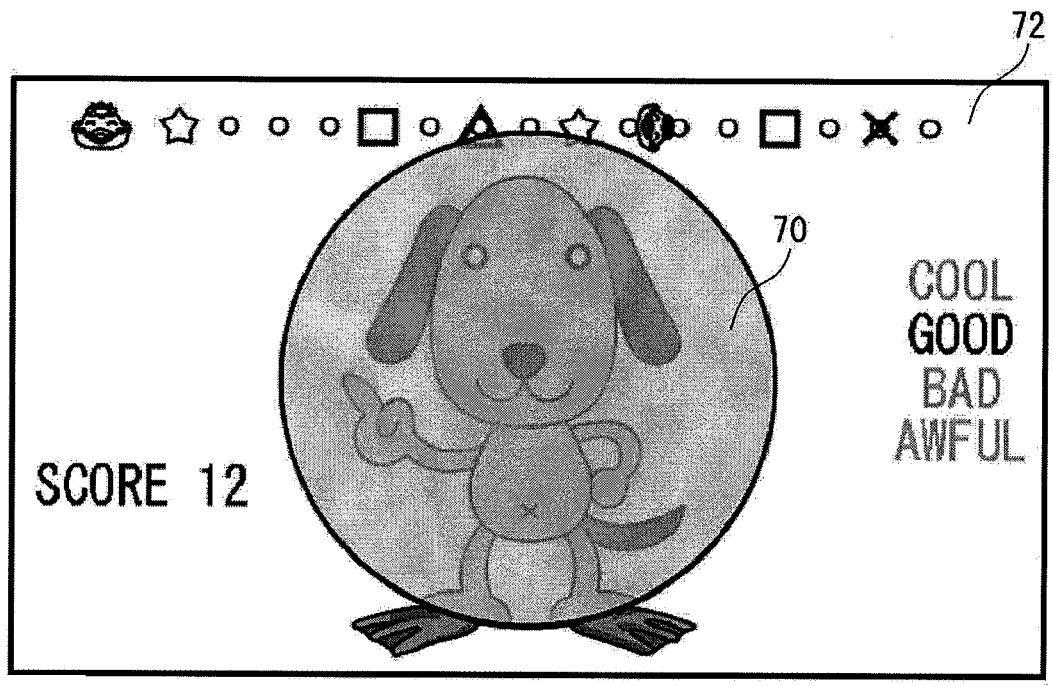
FIGS. 10A and 10B are diagrams showing examples of the display screens to be displayed before resuming the game.
Figure 10B:
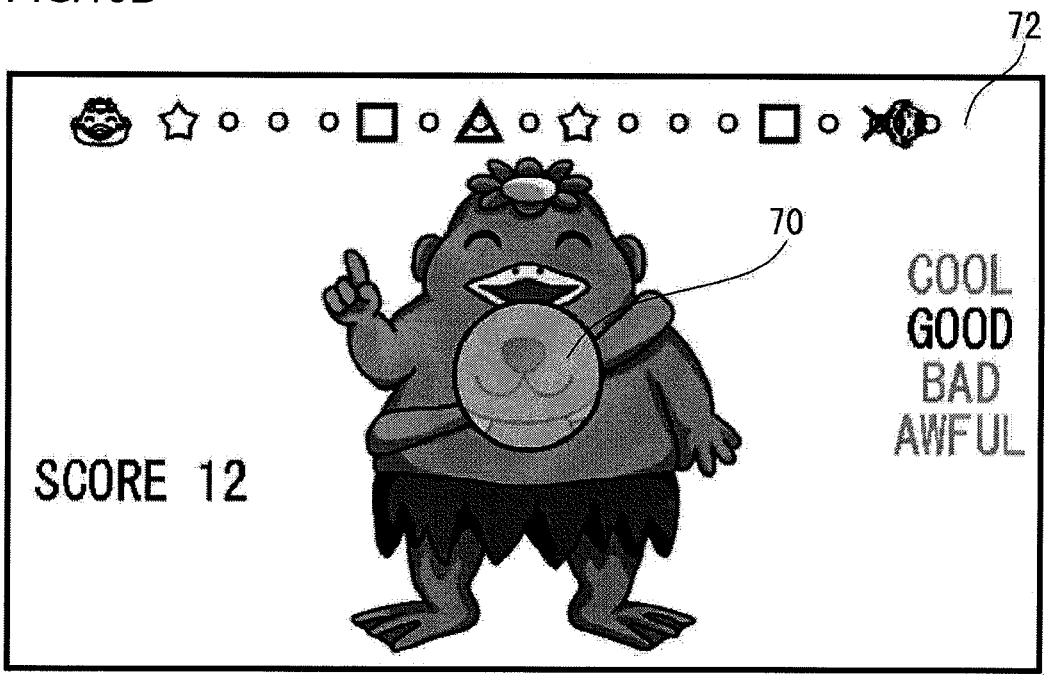

FIGS. 10A and 10B show other examples of the display screens to be displayed before resuming the game. The examples of FIGS. 9A and 9B have used a technique of "iris-in", where the circle expands from the screen center to wipe off the overlying paused screen layer 70 for transition to the redisplay screen layer 72. In contrast, the examples of FIGS. 10A and 10B use a technique of "iris-out," where the circle shrinks from the screen corners to wipe the overlying paused screen layer 70 off the redisplay screen layer 72. In this way, the resume control unit 44 may split the display area of the display device 68 with a predetermined figure, with the display area of the paused screen being inside the figure and the display area of the redisplay screen being outside the figure. The figure is then shrunk gradually so that the display area of the paused screen decreases gradually and the display area of the redisplay screen increases gradually. The figure may be a circle, polygon, star-shaped, heart-shaped, lattice, etc. Character outlines and the like are also applicable. The figure may be located in the center of the display screen of the display device 68, and may be expanded or shrunk from/to the center of the display screen.

Figure 11A:
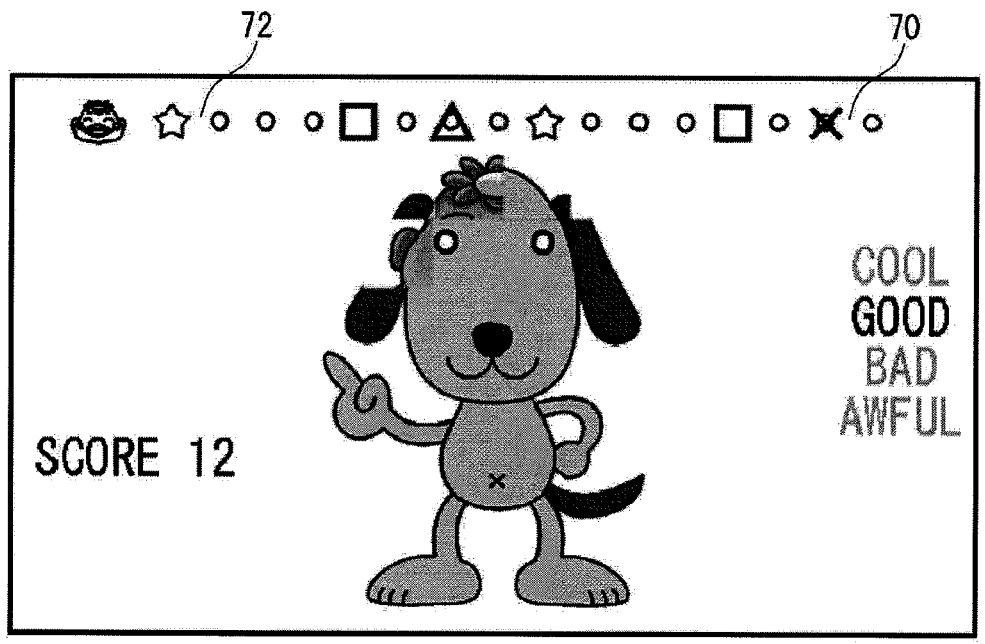
FIGS. 11A and 11B are diagrams showing examples of the display screens to be displayed before resuming the game.
Figure 11B:
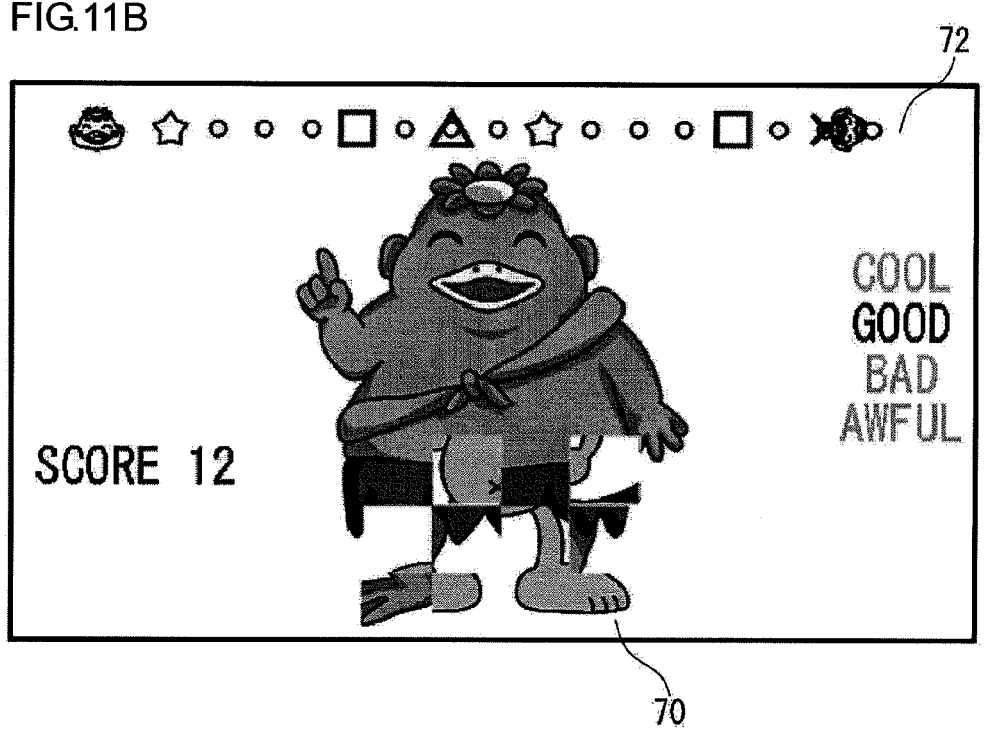

FIGS. 11A and 11B show other examples of the display screens to be displayed before resuming the game. The examples of FIGS. 11A and 11B use a "checker board" technique in which the paused screen layer 70 at the top is cut away to disappear in a grid pattern from the top left in succession.

Figure 12A:
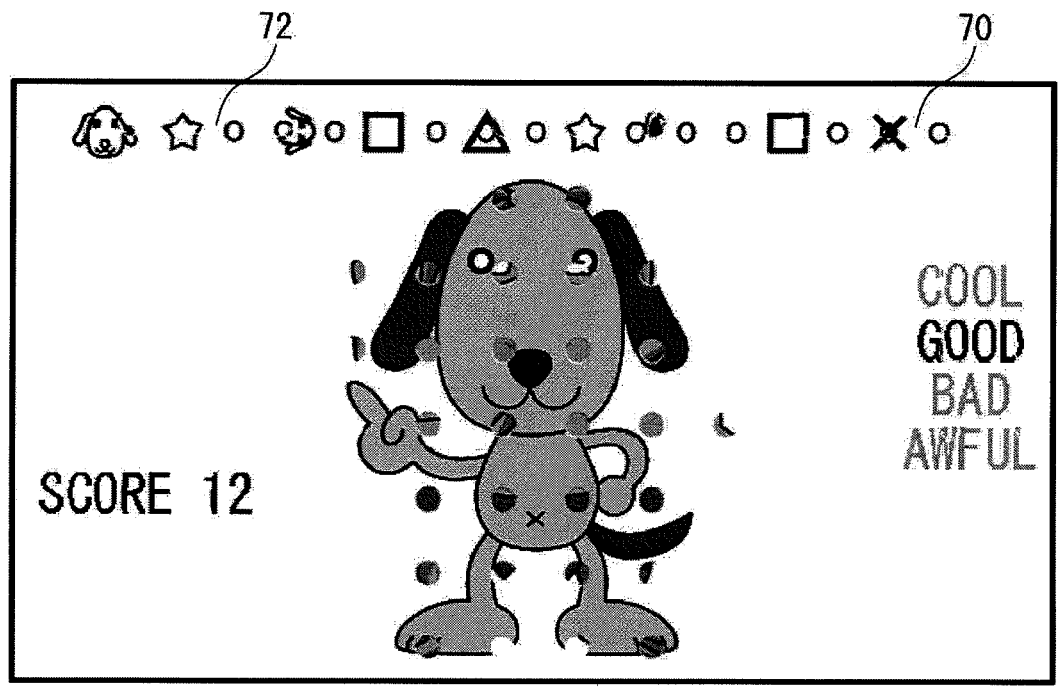
FIGS. 12A and 12B are diagrams showing examples of the display screens to be displayed before resuming the game.
Figure 12B:
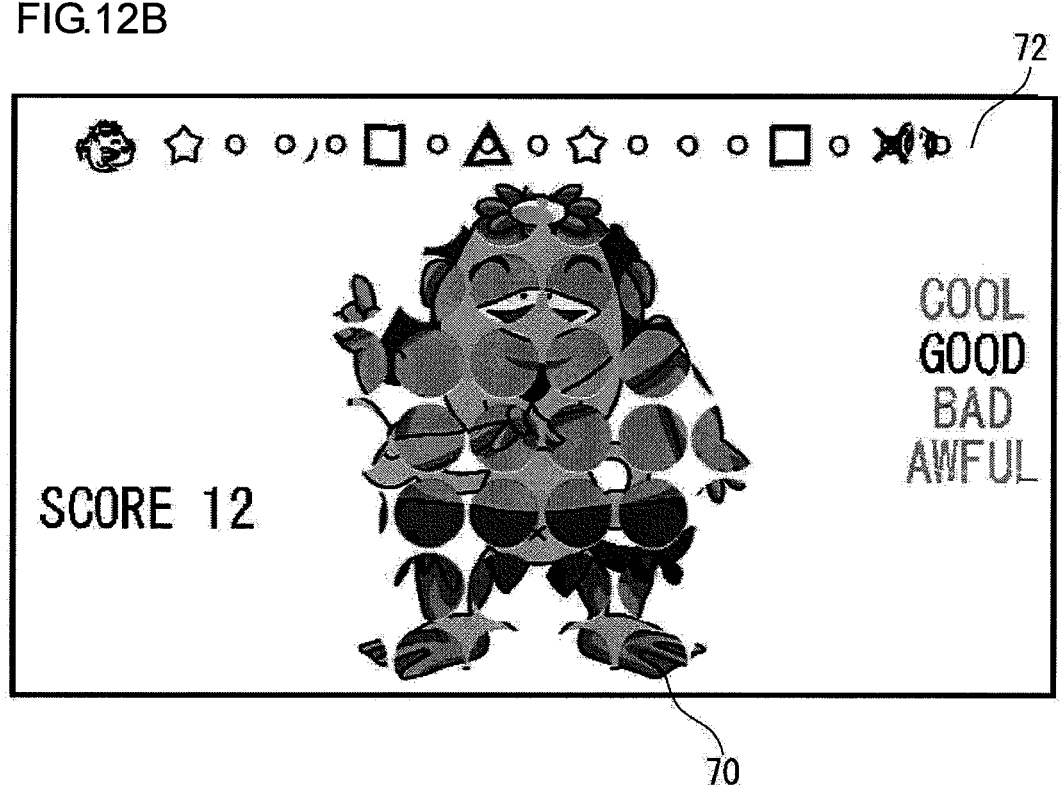

FIGS. 12A and 12B show other examples of the display screens to be displayed before resuming the game. In the examples of FIGS. 12A and 12B, a plurality of circles are arranged in a polka-dot pattern, with the display areas for the redisplay screen inside the circles and the display area for the paused screen outside the circles. Then, the circles are gradually increased in diameter. The display areas may be split by a plurality of figures in this way.

Figure 13A:
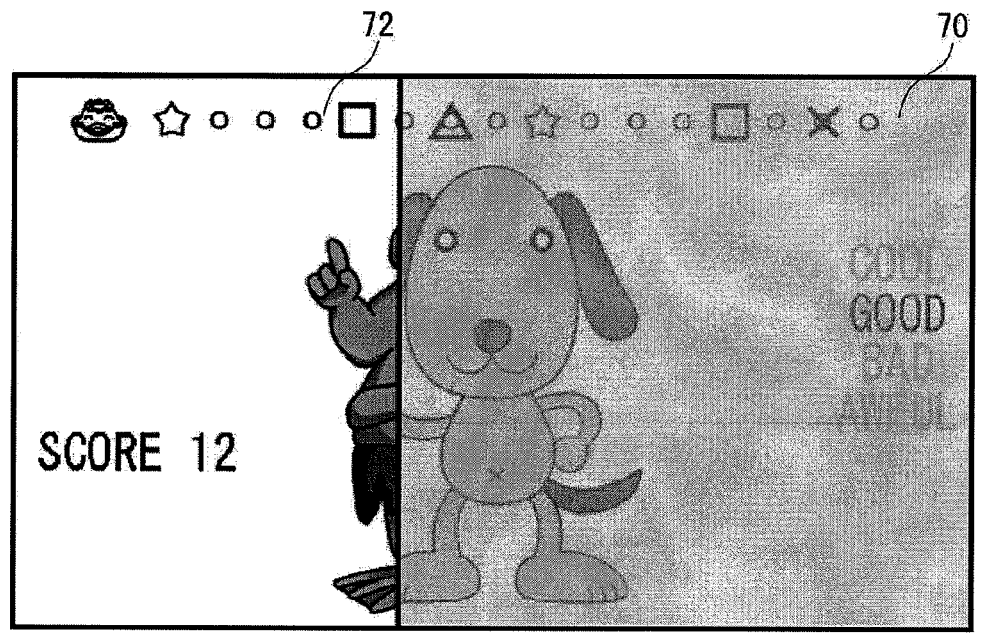
FIGS. 13A and 13B are diagrams showing examples of the display screens to be displayed before resuming the game.
Figure 13B:
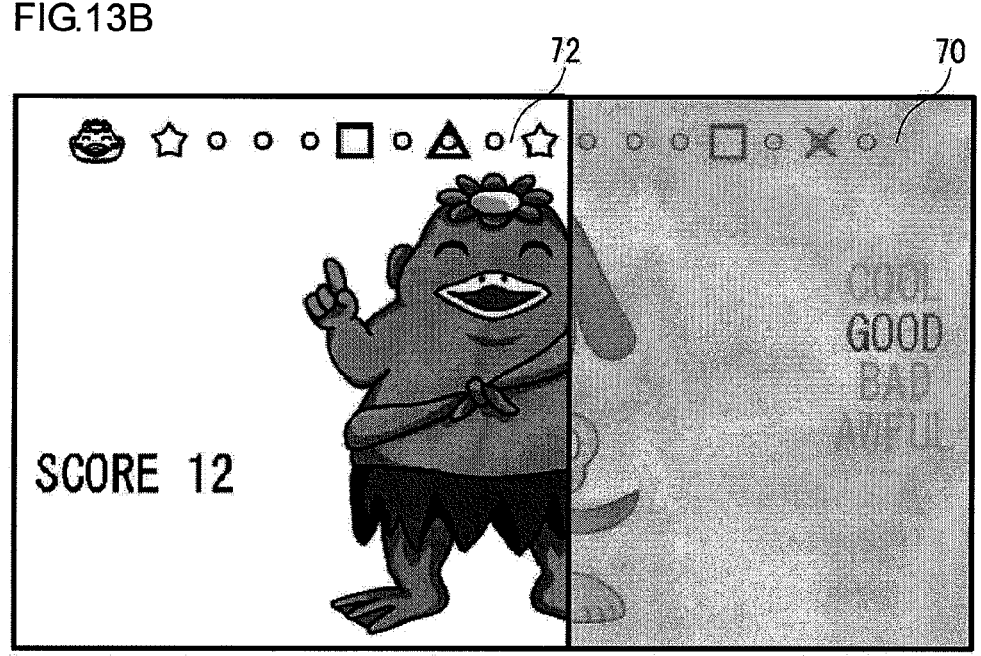

FIGS. 13A and 13B show other examples of the display screens to be displayed before resuming the game. The examples of FIGS. 13A and 13B use a technique of "wiping," in which the paused screen layer 70 at the top is gradually wiped away by a line moving from the left of the screen, thereby changing it to the redisplay screen layer 72. The resume control unit 44 may thus split the display area of the display device 68 with a straight or curved line, with the display area for the paused screen on one side and the display area for the redisplay screen on the other side. The straight or curved line is then moved in a direction to increase the display area for the redisplay screen, so that the display area for the paused screen gradually decreases and the display area for the redisplay screen gradually increases.

Figure 14A:
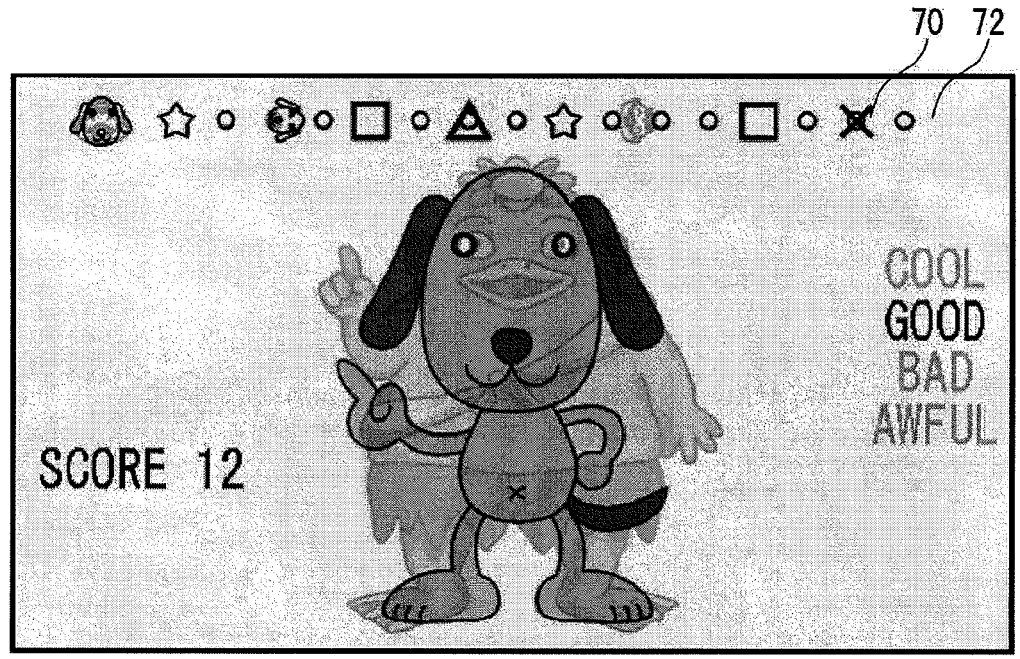
FIGS. 14A and 14B are diagrams showing examples of the display screens to be displayed before resuming the game.
Figure 14B:
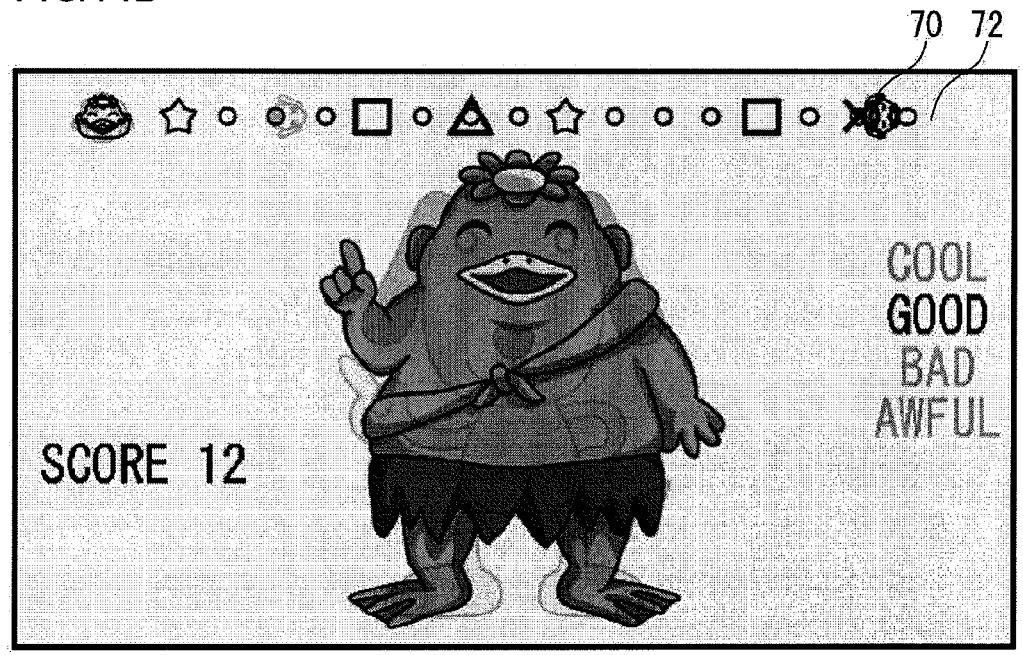

FIGS. 14A and 14B show other examples of the display screens to be displayed before resuming the game. The examples of FIGS. 14A and 14B use a technique of "dissolving (cross-fade)," in which the paused screen layer 70 at the top is gradually made more transparent so that it gradually disappears. The resume control unit 44 may thus gradually increase the transparency of the paused screen so that the paused screen disappears and the game resumes when the redisplay screen reaches the pausing point. In addition, camera motions such as "zoom-in," "zoom-out," and "pan" may be used to change from the paused screen layer 70 to the redisplay screen layer 72. Other techniques may similarly be used to create a gradual change from the paused screen layer 70 to the redisplay screen layer 72.

The same also applies to sound. Before resuming the game, past sound may be reproduced in a mode different from that of normal sound generated by the sound control unit 45. For example, noise may be added. The sound volume may be lowered. The mode may be changed to approach the normal mode gradually. For example, reproduction may be started with a lower volume starting at time tb and the volume then gradually increased up to a normal level at time ta. This allows the user to make a distinction easily between the state where the past game is being reproduced and the state where the game is resumed.

The history holding unit 43 is capable of retaining parameters for regenerating at least (ta-tb) seconds of display screens and sound. During the progress of the game, the game control unit 41 overwrites old parameters in the history holding unit 43 in succession to record new parameters. Consequently, it is always possible to regenerate display screens and sound starting from (ta-tb) seconds before.

Suppose that past display screens and sound are being reproduced starting from time tb when the pause button 24 is pressed again to pause the game, and then the game is again resumed. Even at the second resumption, past display screens and sound may be again reproduced starting from time tb. In this case, the history holding unit 43 has only to hold (ta-tb) seconds of history.

Figure 15:
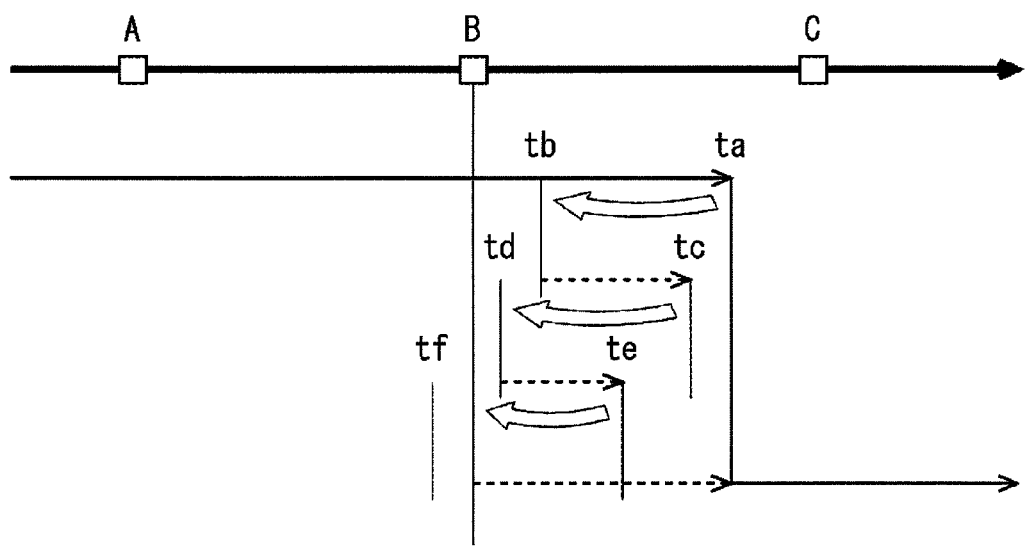
FIG. 15 is a diagram explaining another method of resuming the game after a pause button is pressed consecutively.

FIG. 15 is a diagram explaining another method for resuming the game after the pause button is pressed consecutively. Suppose that the pause button 24 is pressed to pause for the first time at time ta, reproduction is started from time tb to resume the game, and then a pause is requested for the second time at time tc before time ta is reached. In the example of FIG. 15, the game is then resumed by starting reproduction from a point as far back from time tc as with the first time, i.e., time td. Because repeating this operation can lead infinitely back in history, however, there are provided break points beyond which reproduction will not be brought back. When a pause is further requested for the third time at time te, reproduction might be started from time tf if it were to be taken back by the same amount of time as with the first time and the second time. Since time tf is farther back than the break point B, the reproduction is started from the break point B, not from beyond the break point B. Consequently, in this case, the history holding unit 43 need not retain past parameters beyond the break point B. Subsequently, the reproduction up to time ta finishes and the game is resumed. After the game is resumed, the game control unit 41 records a new history into the history holding unit 43. After a lapse of (ta-tb) seconds since the break point C, parameters between the break points B and C are erased from the history holding unit 43 because it is unnecessary to go back beyond the break point C even if paused.

Up to this point, the present invention has been described in conjunction with the embodiment thereof. This embodiment has been given solely by way of illustration. It will be understood by those skilled in the art that various modifications may be made to combinations of the foregoing components and processes, and all such modifications are also intended to fall within the scope of the present invention.

What is claimed is:

1. A game control program stored in non-transitory memory on a gaming apparatus having a processor for controlling the output of a display device comprising:
    a control module which controls progress of a game in accordance with an operation instruction accepted from a user using an input device in communication with the gaming apparatus;
    a display module which generates a display screen of the game and displays it on a display device;
    a stop module which stops the progress of the game on the display screen at that point in time displayed on the display device when an operation instruction to pause the game is accepted from the user using an input device; and
    a resume module which resumes the game after redisplaying display screens on the display device as redisplay screens from a point in time which is a predetermined period before the pausing point up to the pausing point on the display device when a request to resume the game is accepted from the user with the game in a paused state,
    wherein the resume module which resumes the game displays the redisplay screens from the point in time which is the predetermined period before the pausing point up to the pausing point on the display device in a display mode different from that of the display screen displayed by the module which displays a display screen, and gradually changes the display mode of the redisplay screen from the display mode different from that of the display screen to that of the display screen such that the display mode of the redisplay screen is reached to that of the display screen when the redisplay screen reaches the display screen at the pausing point.

2. The game control program product according to claim 1, wherein the control module which controls the progress of the game rejects an operation instruction from the user using the input device while the module which resumes the game redisplays the display screens from the point in time which is the predetermined period before the pausing point up to the pausing point on the display device.

3. The game control program according to claim 1, wherein the resume module which resumes the game identifiably notifies the user of the resumption of the game on the display device after redisplaying the display screens up to the pausing point on the display device before.

4. A game control program product stored in non-transitory memory on a gaming apparatus having a processor for controlling the output of a display device comprising:
- a control module which controls progress of a game in accordance with an operation instruction accepted from a user using an input device in communication with the gaming apparatus;
- a display module which generates a display screen of the game and displays it on a display device;
- a stop module which stops the progress of the game with the display screen at that point in time displayed on the display device when an operation instruction to pause the game is accepted from the user using the input device; and
- a resume module which resumes the game after redisplaying display screens from a point in time which is a predetermined period before the pausing point up to the pausing point on the display device when a request to resume the game is accepted from the user using the input device with the game in a paused state,
- wherein the resume module which resumes the game splits a display area of the display device into a display area for displaying a paused screen and a display area for displaying a redisplay screen when the request to resume the game is accepted from the user and simultaneously displaying the paused screen and the redisplay screen, the paused screen showing the display screen at the pausing point, the redisplay screen showing the display screens from the point in time which is the predetermined period before the pausing point up to the pausing point; gradually decreases the display area of the paused screen and gradually increases the display area of the redisplay screen; and makes the paused screen to disappear and resumes the game when the redisplay screen reaches the display screen at the pausing point.

5. The game control program product according to claim 4, wherein the resume module which resumes the game splits the display area of the display device by a predetermined figure, with the display area of the paused screen outside the figure and the display area of the redisplay screen inside the figure; and gradually expands the figure so that the display area of the paused screen gradually decreases and the display area of the redisplay screen gradually increases.

6. The game control program product according to claim 4, wherein the resume module which resumes the game splits the display area of the display device by a predetermined figure, with the display area of the paused screen inside the figure and the display area of the redisplay screen outside the figure; and gradually shrinks the figure so that the display area of the paused screen gradually decreases and the display area of the redisplay screen gradually increases.

7. The game control program product according to claim 5, wherein the figure is located in a center of the display screen of the display device, and is expanded or shrunk from/to the center of the display screen.

8. The game control program product according to claim 4, wherein the resume module which resumes the game splits the display area of the display device by a straight or curved line, with the display area of the paused screen on one side and the display area of the redisplay screen on the other side; and moves the straight or curved line in parallel in a direction of increasing the display area of the redisplay screen so that the display area of the paused screen gradually decreases and the display area of the redisplay screen gradually increases.

9. The game control program according to claim 1, wherein the resume module which resumes the game displays on the display device a paused screen as superimposed on a redisplay screen when the request to resume the game is accepted from the user, the paused screen showing the display screen at the pausing point, the redisplay screen showing the display screens from the point in time which is the predetermined period before the pausing point up to the pausing point; gradually increases the transparency of the paused screen; and makes the paused screen to disappear and resumes the game when the redisplay screen reaches the display screen at the pausing point.

10. The game control program according to claim 1, further comprising a generation module which generates sound of the game and outputs it from a speaker in communication with the gaming apparatus, and wherein
- the resume module which resumes the game outputs sound from the speaker while redisplaying the display screens from the point in time which is the predetermined period before the pausing point up to the pausing point on the display device.

11. The game control program according to claim 10, wherein the module which resumes the game outputs sound from the speaker from the point in time which is the predetermined period before the pausing point up to the pausing point from the speaker in a mode different from that of the sound output by the module which outputs sound.

12. The game control program according to claim 11, wherein the resume module which resumes the game gradually changes sound from the mode different from that of the sound generated by the generation module which outputs sound to that of the sound generated by the module which outputs sound.

13. The game control program according to claim 1, further comprising a history module which stores in a memory a history of parameters necessary for regenerating the display screens or sound displayed or output previously into a memory during the progress of the game, and wherein
- the resume module which resumes the game refers to the parameters stored in the memory, and generates the display screens or sound from the point in time which is the predetermined period before the pausing point up to the pausing point.

14. The game control program according to claim 13, wherein the memory has a capacity capable of storing parameters necessary for generating at least the predetermined period of display screens or sound.

15. The game control program according to claim 1, wherein the resume module which resumes the game establishes a break point beyond which redisplay will not be taken back; and when an operation instruction to pause the game is accepted from the user using the input device again while redisplaying the display screens from the point in time which is the predetermined period before the pausing point up to the pausing point on the display device, then redisplays display screens from the break point, not from beyond the break point, up to the pausing point on the display device if a point in time which is the predetermined period before the re-pausing point falls on back beyond the break point.

16. A game apparatus having an input device, a display device, and a processor comprising:
- a control unit which controls progress of a game using a processor in accordance with an operation instruction accepted from a user using the input device;

a display control unit which generates a display screen of the game controlled by the control unit and displays it on a display device;

a pause control unit which stops the progress of the game by the control unit with the display screen at that point in time displayed on the display device when an operation instruction to pause the game is accepted from the user using the input device; and a resume control unit which makes the control unit resume the game after redisplaying display screens as redisplay screens from a point in time which is a predetermined period before the pausing point up to the pausing point on the display device when a request to resume the game is accepted from the user in a paused state, wherein the resume control unit displays the redisplay screens from the point in time which is the predetermined period before the pausing point up to the pausing point on the display device in a display mode different from that of the display screen displayed by the display control unit, and gradually changes the display mode of the redisplay screen from the display mode different from that of the display screen to that of the display screen such that the display mode of the redisplay screen is reached to that of the display screen when the redisplay screen reaches the display screen at the pausing point.

17. A game control method comprising:

controlling progress of a game in accordance with an operation instruction accepted from a user using an input device;

generating a display screen of the game, using a processor, and displaying it on a display device;

stopping the progress of the game with the display screen at that point in time displayed on the display device when an operation instruction to pause the game is accepted from the user using the input device; and resuming the game after redisplaying display screens as redisplay screens from a point in time which is a predetermined period before the pausing point up to the pausing point on the display device when a request to resume the game is accepted from the user with the game in a paused state, wherein the resuming the game displays the redisplay screens from the point in time which is the predetermined period before the pausing point up to the pausing point on the display device in a display mode different from that of the display screen displayed in the displaying a display screen, and gradually changes the redisplay mode of the display screen from the display mode different from that of the display screen to that of the display screen such that the display mode of the redisplay screen is reached to that of the display screen when the redisplay screen reaches the display screen at the pausing point.

18. A non-transitory computer readable recording medium storing a game control program comprising:

a module which controls progress of a game in accordance with an operation instruction accepted from a user;

a module which generates a display screen of the game and displays it on a display device;

a module which stops the progress of the game with the display screen at that point in time displayed on the display device when an operation instruction to pause the game is accepted from the user; and a module which resumes the game after redisplaying display screens as redisplay screens from a point in time which is a predetermined period before the pausing point up to the pausing point on the display device when a request to resume the game is accepted from the user with the game in a paused state, wherein the module which resumes the game display the redisplay screens from the point in time which is the predetermined period before the pausing point up to the pausing point on the display device in a display mode different from that of the display screen displayed by the module which displays a display screen, and gradually changes the display mode of the redisplay screen from the display mode different from that of the display screen to that of the display screen such that the display mode of the redisplay screen is reached to that of the display screen when the redisplay screen reaches the display screen at the pausing point.

* * * * *